United States Patent [19]
Chang et al.

[11] Patent Number: 5,359,413
[45] Date of Patent: Oct. 25, 1994

[54] SYSTEM FOR SUBSTANTIALLY ELEMINATING LOCK-IN IN A RING LASER GYROSCOPE

[75] Inventors: Timothy H. Chang, Pompton Plains; Bo H. G. Ljung, Wayne; Bernard Friedland, West Orange, all of N.J.

[73] Assignee: Kearfott Guidance and Navigation Corporation, Wayne, N.J.

[21] Appl. No.: 819,746

[22] Filed: Jan. 13, 1992

[51] Int. Cl.5 .............................................. G01C 19/66
[52] U.S. Cl. ..................... 356/350; 372/94; 372/107
[58] Field of Search ................ 356/350; 372/94, 107

[56] References Cited

U.S. PATENT DOCUMENTS

| | | |
|---|---|---|
| 3,373,650 | 2/1965 | Killpatrick . |
| 3,752,586 | 8/1973 | Hutchings et al. . |
| 3,992,952 | 11/1976 | Hutton et al. . |
| 4,099,876 | 7/1978 | Dorsman . |
| 4,152,071 | 5/1979 | Podgorski ........................ 356/350 |
| 4,281,930 | 8/1981 | Hutchings . |
| 4,410,274 | 10/1983 | Ljung ............................... 356/350 |
| 4,410,276 | 10/1983 | Ljung et al. ....................... 356/350 |
| 4,422,762 | 12/1983 | Hutchings et al. . |
| 4,592,656 | 6/1986 | Egli . |
| 4,597,667 | 7/1986 | Curby et al. . |
| 4,653,918 | 3/1987 | Stjern et al. . |
| 4,653,919 | 3/1987 | Stjern ............................... 356/350 |
| 4,686,683 | 8/1987 | Martin ............................. 356/350 |
| 4,779,985 | 10/1988 | Wirt . |
| 4,790,658 | 12/1988 | Sewell . |
| 4,801,206 | 1/1989 | Benoist . |
| 4,807,999 | 2/1989 | Soo Hoo . |
| 4,824,252 | 4/1989 | Lim et al. .......................... 356/350 |
| 4,844,615 | 7/1989 | Benoist . |
| 4,846,574 | 7/1989 | Upton, Jr. . |
| 4,898,469 | 2/1990 | Sewell et al. . |

*Primary Examiner*—Samuel A. Turner
*Attorney, Agent, or Firm*—Klauber & Jackson

[57] ABSTRACT

A ring laser gyro system having at least one fixed mirror, and two movable mirror assemblies, for causing a pair of laser beams to counter-rotate therebetween, including amplitude control circuits and a phase control circuit for causing the movable mirror assemblies to sinusoidally oscillate at the same amplitude and frequency, but 180° out of a phase with one-another, to substantially eliminate lock-in.

21 Claims, 8 Drawing Sheets

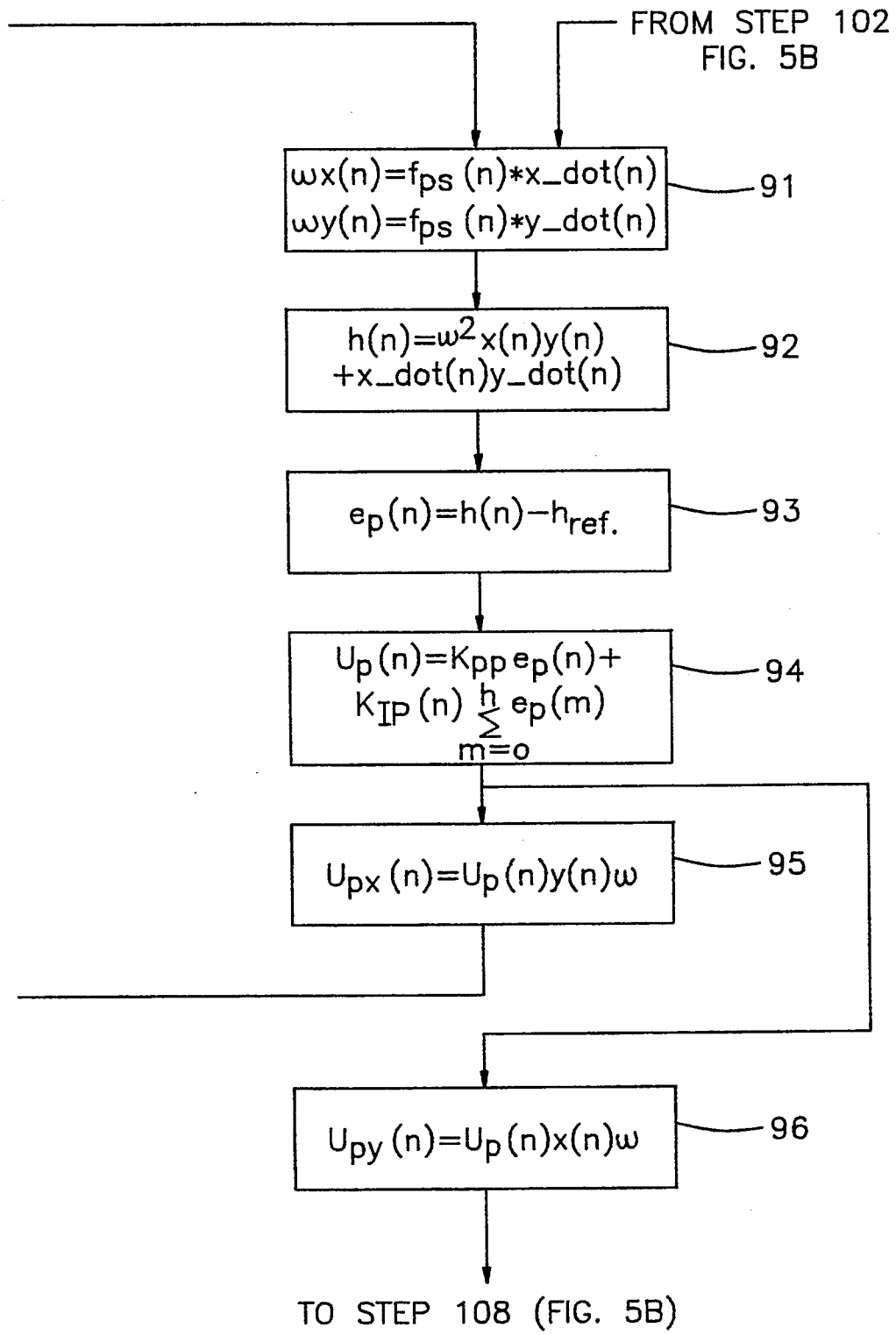

SYSTEM FOR SUBSTANTIALLY ELEMINATING LOCK-IN IN A RING LASER GYROSCOPE

FIELD OF THE INVENTION

The field of the present invention relates generally to inertial guidance, and more specifically to ring-laser gyroscopes.

BACKGROUND OF THE INVENTION

Ring laser gyros (RLG) have been used as inertial rotation sensors for several years. A typical RLG may include three or more mirrors arranged in a triangular or square configuration for reflecting a laser beam causing the laser beam to rotate. First and second laser beams propagate in opposite directions (clockwise and counterclockwise). The RLG has a nominally zero beat frequency between the two beams when the RLG is not rotating. Rotation of the RLG about its input axis causes the effective path length to increase for the beam traveling in the direction of rotation, and to decrease for the beam traveling opposite to the direction of rotation. A beat frequency representative of the frequency difference between the beams results, which is indicative of the angular velocity of the RLG.

A major problem in ring-laser gyros is the phenomenon of lock-in. Lock-in occurs if the input angular velocity falls below a critical value, known as the lock-in rate, $\Omega_L$, causing the gyro to cease providing a useful output because the frequencies of the two oppositely directed travelling waves ($E_1$, $E_2$) in the cavity lock together. A typical known method for overcoming the effect of lock-in is to "dither" the gyro. The dither is an auxiliary input angular velocity, which is applied to the gyro in addition to the external angular velocity that the gyro is required to measure. The dither angular velocity is a periodic or almost periodic signal having an average value of zero. The amplitude of the dither input is selected so that the sum of the external angular velocity and the dither velocity are well above the lock-in rate during most of the dither cycle.

The most common technique of supplying the dither angular velocity in the current generation of ring-laser gyros is called "body dither" whereby the gyro block is mounted on a torsional spring assembly so that it is free to move angularly relative to the case of the instrument. The block is set into oscillation, the amplitude of which is maintained by means of an automatic gain control (AGC). However, body dither is undesirable in that the spring assembly requires power to keep it in motion, occupies excess space, and adds unwanted weight. Moreover, the instantaneous angular motion of the gyro block may be too large to permit mounting thereon of the accelerometers required for an inertial navigation system. In addition, the injection of mechanical noise into the dither motion, necessary for the elimination of lock-in, leads to noise, known as random walk, thereby limiting the accuracy of the RLG. Also, the motion of the gyro block may induce an effect known as "coning" in which the input axis of the instrument traces out a cone in space which may require the use of high speed compensating computations to determine the true angular velocity.

Many attempts have been made in the prior art to overcome lock-in in RLG systems. A number of such prior systems will now be briefly described.

In Killpatrick, U.S. Pat. No. 3,323,650, a bias system for a laser gyroscope is shown for preventing lock-in of the two beams at low rotational rates when the frequency difference between the beams is small. The laser gyroscope is mechanically oscillated with respect to the base of the laser gyroscope, to cause the relative rotation rate between the beams to be higher than that at which lock-in occurs. The gyroscope is oscillated about its input axis for maintaining an input rate higher than the lock-in rate. Another feature disclosed is the use of optical means for preventing lock-in, wherein a Faraday medium is used to bias the frequency of the two laser beams. Accordingly, through either mechanical or optical biasing, the frequency difference between the counter rotating laser beams is maintained for a majority of the time for avoiding lock-in of the beams.

Hutchings et al., U.S. Pat. No. 3,752,586, teaches a method and apparatus for minimizing frequency locking of a ring laser gyroscope at low rotation rates. The counter rotating beams are frequency modulated in phase opposition to one another with a plurality of signals with mutually different frequencies, and with each of the signals having a predetermined modulation index, whereby the modulation indices of the signals are adjusted for minimizing frequency locking.

Dorsman, U.S. Pat. No. 4,099,876, teaches in a ring-laser gyro the use of a dual phase-coded controller for controlling a three-terminal duo-mode bimorph device having a translational control mode terminal and a torsional control mode terminal pair. The controller includes two mutually phase-coded and selectively biased AC reference signal generators, and a duo-mode differential amplifier interconnecting the signal generators to the bimorph device for dithering each mode of the duo-mode bimorph in response to a mutually exclusive one of the reference signals. The amplifier further includes a control input coupled to one of the two sources of a bipolar control signal for control of a mutually exclusive mode of the duo-mode bimorph device. The control system is a closed loop control system for insuring constant correction of any errors occurring in the system.

Hutchings U.S. Pat. No. 4,281,930 shows a ring laser gyro in which piezoelectric elements are used to mechanically dither each mirror in a phase relationship of 360°/number of mirrors. The mirrors are also oscillated at the same frequency. In this manner, lock-in is substantially prevented. Hutchings et al. U.S. Pat. No. 4,422,762 and Egli U.S. Pat. No. 4,592,656 also slow ring laser gyros with dither mechanisms.

Curby et al., U.S. Pat. No. 4,597,667, discloses an apparatus and method for providing dither control for a multiplicity of ring laser gyros to minimize lock-in and coning errors. The ring laser angular rotation sensors are dithered in an intermittent manner such that a plurality of such sensors having substantially identical natural dither frequencies are periodically energized for dithering in response to the amplitude of dither for a particular sensor, for minimizing lock-in. The use of mechanical dithering is disclosed for preventing lock-in. Electrical dithering is accomplished through the use of a Faraday cell in this latter embodiment. The driving voltage is turned on and off, whereby turn on is accomplished when the current decreases below a predetermined amplitude, and turned off when the current increases above a predetermined amplitude. In this manner, the lock-in band of each ring laser rotation sensor is reduced. Coning effects of low rotation rates or frequencies between three-ring laser angular rotation sensors are avoided through use of mechanical dithering. In an alternative embodiment, lock-in is also avoided by frequency or phase modulating the bias drive voltages in a Faraday cell.

Stjern et al., U.S. Pat. No. 4,653,918, teaches the use of low-Q assemblies for a plurality of laser gyro-dither motors. Drive signals of randomly varying frequency are utilized for dithering the gyros. The frequency modulated dither varies the lock-in rate of the gyro to reduce lock-in effects. The modulating system includes a sine wave generator and a generator for producing a periodic signal having a frequency different from the frequency of the sine wave, whereby the sine wave and the periodic signal are combined for providing the drive signal, with the dither means being responsive to the drive signal for imparting dither motion to the gyroscope.

Wirt, U.S. Pat. No. 4,779,985, discloses a dither suspension for a ring laser gyroscope. A mechanical structure for the dither suspension is disclosed.

Sewell, U.S. Pat. No. 4,790,658, teaches a system for obtaining a correction signal in a dithered ring laser gyroscope, whereby the correction signal is stripped of any components of the dither signal. In this manner, errors due to the dither signal and the control signal supplied by the ring laser gyro are substantially eliminated through such removal of the dither component.

Benoist, U.S. Pat. No. 4,801,206, teaches a ring laser gyroscope system. In column 3, lines 28-32, it is indicated that "one approach to reducing lock-in error is to superimpose a random signal upon the amplitude of the dither driving amplifier. However, the superposition of a random signal on the dither driver produces other substantial errors." It is recognized that the natural resonant frequency of the dither flexure varies with temperature, and that it is desirable to drive the dither flexure at its natural resonant frequency in order to make the most efficient use of the dither energy. The use of a dither drive controller monitoring the resonant frequency of the dither flexure at any given time, and thereby adjusting the dither frequency in order to maintain the frequency of the dither signal at the resonant frequency for optimizing the dithering function, is described. A hinge is required to "dither" the mirrors.

Hoo, U.S. Pat. No. 4,807,999, teaches a ring laser gyroscope that includes two laser sources and a common ring resonator. Two frequency tracking servos are included for peaking the intensity of the clockwise and counter clockwise propagating light beams. A first dither signal generator is used in conjunction with the first laser source, and a second dither signal generator is used in association with the second laser source for providing dithering.

In Lim et al., U.S. Pat. No. 4,824,252, two independent feedback control systems are used for individually altering the lasing path of the ring laser angular rate sensor for minimizing lock-in. One or more mirrors defining the lasing path are dithered and positioned by independent feedback control systems for providing two degrees of freedom for controlling the lasing path.

Benoist, U.S. Pat. No. 4,844,615, teaches a system for correcting random walk errors induced by rate reversals in a dithered ring laser gyroscope. In column 3, lines 28-30, it is indicated that "typical practice is to superimpose a random signal upon the amplitude of the dither driving amplifier". The system generates an accumulated correction in software for each transversal of the lock-in region of the ring laser gyroscope. Heterodyne signals and individual beam intensity signals are utilized for providing the accumulated correction information. The method of the invention includes the step of determining the magnitude of coupling between the counter rotating beams, and further includes detecting changes in the direction of the dither oscillations, measuring the intensities of the two beams, and forming a sum signal from the measured intensities. A Heterodyne signal is formed that is indicative of the beat frequency produced by interference between the counter rotating beams, whereby the sum signal is demodulated with the heterodyne signal. In this manner, the degree of coupling between the beams is determined.

Upton, Jr., U.S. Pat. No. 4,846,574, teaches the use of a retro-reflector external to the closed-loop path of a ring laser system for redirecting energy of one of the counter rotating beams into the direction of travel of the other counter rotating beam, for substantially reducing lock-in effects.

Sewell, U.S. Pat. No. 4,898,469, describes a system for removing a dither signal from the output signal of a dithered ring laser system.

To avoid the problems of body dither, Ljung et al., as described in U.S. Pat. Nos. 4,410,274 and 4,410,276, teaches a mirror dither concept called "Doppler Mirrors". In the Doppler mirror, instead of dithering the entire gyro body, only two of the mirrors on the RLG are dithered. As discussed in these patents, and in a technical paper entitled "Reduction of Beam Coupling In a Ring-laser Gyro by Doppler Shifting of The Scattered Light" by R. A. Patterson, B. Ljung, and D. A. Smith in SPIE, Vol. 487, pp. 78-84, 1984, the lock-in effect is minimized, or entirely canceled when the oscillatory motions of the two mirrors are exactly equal and opposite, and when the amplitude of the oscillation is at one of the first order Bessel nulls.

As shown in U.S. Pat. Nos. 4,410,274 and 4,410,276, the Doppler mirror concept was applied to a gyro with a triangular light path. The concept, however, is not limited to a triangular light path. The application to a gyro with a square light path is described in Martin U.S. Pat. No. 4,686,683, wherein it is shown that the effect described in the earlier patents by Ljung et al. is achieved by moving two adjacent mirrors of the four that determine the light path. The motion of each of the two moving mirrors must be equal in magnitude and opposite in sign to that of the other.

To achieve the proper Doppler mirror effect, it is essential that the motion of the two moving mirrors have exactly the correct amplitude, and be 180° out-of-phase. The systems described in the earlier patents listed above, however, are open loop systems. In such systems, an external oscillator provides a reference signal which each of the mirrors is required to track, one with zero phase shift and the other with 180° of phase shift. Although Martin's U.S. Pat. No. 4,686,683 teaches the use of a feedback control system to maintain the amplitude of the oscillation, no means is provided to maintain the desired phase relation. It has been shown that even a small deviation of phase from the ideal 180° will result in excessive "residual lock-in", $\Omega_{RL}$. Hence a gyro using the drive system described in U.S. Pat. No. 4,686,683 does not operate reliably.

Another problem with the use of an external oscillator as the source of the reference motion is that this motion may be difficult for the mirrors to achieve owing to their mechanical construction. Since the mirrors have a natural resonance frequency, they will move most readily at their frequency of resonance, which should thus be chosen as the frequency at which the mirrors should be vibrated to achieve the "Doppler Mirror" effect. However, the resonant frequency of the mirrors will not be constant because of temperature and other similar effects. Thus, with an external oscillator as a reference signal, it will not be possible to maintain the motion of the mirrors at resonance.

SUMMARY OF THE INVENTION

An object of the invention is to provide an improved method and apparatus for preventing lock-in in a ring-laser gyro.

Another object is to reduce the residual lock-in, $\Omega_{RL}$, to the lowest possible value in an associated ring-laser gyro.

With these and other objects in mind, and in view of the problems in the prior art, the present invention provides in one embodiment means for maintaining the oscillation of each mirror of a ring-laser gyro at resonance without requiring the use of an external reference signal. Also, active control system means are provided for controlling the phase of the motion of each mirror relative to the other mirrors.

BRIEF DESCRIPTION OF THE DRAWINGS

Various embodiments of the present invention are described with reference to the following drawings, in which like items have the same reference designation, wherein.

DETAILED DISCUSSION OF THE INVENTION

The theory underlying the Doppler mirror concept is presented in the above-discussed technical paper by Patterson, Ljung, and Smith. More specifically, the paper presents an analysis relative to a gyro with a triangular path, and the teachings therein are incorporated herein by reference.

Figure 1:
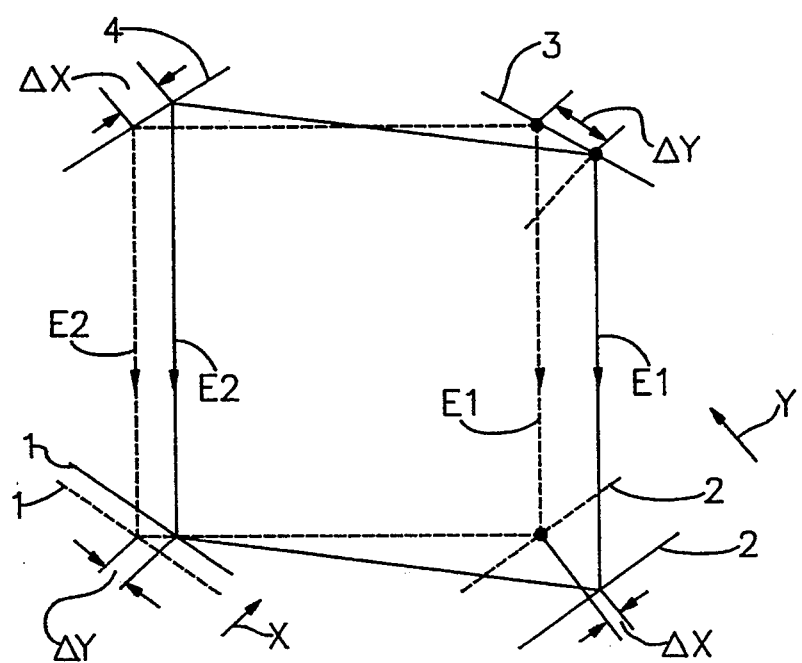
FIG. 1 is a simplified mechanical configuration of one embodiment of the invention providing doppler mirror motion.

For an RLG gyro with a square light path, and with two movable mirror assemblies 1, 2, and two fixed mirrors 3, 4, respectively, as shown in FIG. 1, a similar analysis yields the following equations that govern the operation of the gyro:

$$\dot{I}_1 = (C/L)I_1 \left[ \alpha_1 - \beta_1 I_1 - \theta_{12} I_2 - \sum_{n=1}^{4} \rho_{2n} \cos(\Psi + \epsilon_{2n}) \right] \quad (1)$$

$$\dot{I}_2 = (C/L)I_2 \left[ \alpha_2 - \beta_2 I_2 - \theta_{21} I_1 - \sum_{n=1}^{4} \rho_{1n} \cos(\Psi - \epsilon_{1n}) \right]$$

$$\dot{\Psi} = (C/L) \left[ \Omega + \tau_{21} I_1 - \tau_{12} I_2 - \sum_{n=1}^{4} \rho_{2n} \sin(\Psi + \epsilon_{2n}) - \right.$$

$$\left. \sum_{n=1}^{4} \rho_{1n} \sin(\Psi - \epsilon_{1n}) \right]$$

where $I_1$, $I_2$, and $\Psi$ are, respectively, the laser intensities for beams E1 and E2 and the instantaneous phase difference between the two beams. Also, L is the effective length of the beam path, C is the speed of light, $\tau$ is a mode pulling-pushing term, $\alpha$ is the loss in power of laser, $\beta$ is the "hole burning", $\Theta$ is the saturation term, and $\rho$ is back scattering coefficient. The phase shift $\epsilon_{ij}$ of the backscattered light is given as follows:

$$\epsilon_{11} = \epsilon_{11}^0 - (2\pi y\sqrt{2}\lambda)$$

$$\epsilon_{21} = \epsilon_{21}^0 + (2\pi y\sqrt{2}\lambda)$$

$$\epsilon_{12} = \epsilon_{12}^0 + (2\pi x\sqrt{2}\lambda)$$

$$\epsilon_{22} = \epsilon_{22}^0 - (2\pi x\sqrt{2}\lambda)$$

$$\epsilon_{13} = \epsilon_{13}^0 - (2\pi y\sqrt{2}\lambda)$$

$$\epsilon_{23} = \epsilon_{23}^0 + (2\pi y\sqrt{2}\lambda)$$

$$\epsilon_{14} = \epsilon_{14}^0 + (2\pi x\sqrt{2}\lambda)$$

$$\epsilon_{24} = \epsilon_{24}^0 - (2\pi x\sqrt{2}\lambda) \quad (2)$$

The terms $\epsilon_{ij}^0$ are constant phase shifts which arise from the backscattering phenomenon, and x and y represent axes of displacement of movable mirror assemblies 1 and 2. $\lambda$ is the laser wavelength. In the notation, the first subscript of $\epsilon_{ij}$ designates beam i, for i=E1,E2 and the second subscript j for j=1,2,3,4 denotes the mirror number, respectively. As previously indicated, mirror assemblies 1 and 2 are movable mirrors, and mirrors 3 and 4 are non-movable mirrors. Mirror assemblies 1 and 2 are shown by solid lines at one position, and by dashed lines or in phantom at a displaced position relative to the solid lined position, respectively. The beam paths shown in phantom for E1 and E2 are for mirror assemblies 1 and 2 at their phantom positions, and the solid-lined positions, for example. Note that the phantom-lined beam paths for E1 and E2 relative to the solid line beam paths therefor are displaced by $\Delta y$ with respect to mirror assemblies 1 and 3, and by $\Delta x$ with respect to mirror assemblies 2 and 4, as shown. In this example, $\Delta x$ is x/2, and $\Delta y$ is y/2. It can be shown that as mirror assemblies 1 and 2 are modulated in position, the lengths L of the beam paths for beams E1 and E2 are changed. In the preferred construction the movable mirror assemblies 1, 2 are planar, and the non-movable mirrors 3, 4 are spherical, for example. However, other radii of curvature are also possible, and the illustrated mirror configurations are not meant to be limiting.

If in equation (1), the displacements x and y of the movable mirror assemblies 1, 2 are equal and opposite, i.e. $x = -y = A \sin(\omega t)$, where A is the amplitude of oscillation of mirror assemblies 1 and 2, and $\omega$ is the mirror resonance frequency in radians/sec., then equations (1) and (2) may be simplified to yield:

$$\dot{\Psi} = (C/L)\Omega + (8C/L)\rho_k \cos \rho_k \cos ((2\pi A \div \lambda\sqrt{2}) \sin \omega t) \sin \Psi \quad (3)$$

where k is a subscript for each term, C is the speed of light, and L is the length of the laser beam path.

The frequency modulation term $\cos ((2\pi A \div \lambda\sqrt{2}) \sin \omega t)$ can be expressed as an infinite series:

$$\cos(\delta \sin \omega t) = \sum_{n=-\infty}^{n=\infty} J_n(\delta) \cos(n\omega t) \quad (4)$$

where $J_n(.)$ is the $n^{th}$ order Bessel function of the first kind, $\Omega_L = (8C/L)\rho_k \cos \epsilon_k$ is the inherent lock-in rate, and $\delta = 2\pi A \div \lambda\sqrt{2}$ is the modulation index. $\Psi_b$, the baseband component of $\Psi$ can now be obtained by retaining only the low frequency terms in (4), as follows:

$$\dot{\Psi}_b = (C/L)\Omega + \Omega_L J_0(\delta) \sin \Psi_b \quad (5)$$

The term $\Omega_L J_0(\delta) = \Omega_{RL}$ is known as the residual lock-in. As previously mentioned, the objective of each of the embodiments of this invention is to reduce $\Omega_{RL}$ to the lowest possible levels. This is achieved by setting $\delta$ to one of $J_0(\delta)$'s Bessel nulls, i.e. $\delta = 2.405, 5.520, 8.654, 11.791, \ldots$ Small errors in implementing the required relations for x and y cause unacceptably large residual lock-in effects. The better the implementation, the lower the threshold $\Omega_{RL}$. To achieve an acceptable low value of $\Omega_{RL}$, it is necessary to use an active control system, such as a closed-loop system, to accurately control the motion of the two movable mirror assemblies 1, 2, respectively.

The mirror assemblies 1, 2 oscillate at resonance 180° out of phase from one another at some predetermined amplitude A. For each mirror assembly 1, 2, there is a unique resonant frequency. Each mirror assembly 1, 2 in combination with a piezo driver element 64 and a piezo pick-off element 62 (see FIGS. 6 and 7), form a tank circuit for establishing a frequency of oscillation for the associated mirror assemblies 1, 2. The mirror assemblies 1, 2 oscillate sinusoidally at the same frequency. Closed-loop control circuitry (see FIGS. 2–4) operates in various embodiments of the invention to maintain a desired phase or time delay between the periods of oscillation of the mirror assemblies 1, 2.

To implement the control system, each of the movable mirror assemblies 1, 2, is equipped with a driver signal line 10, 12 and pick-off signal line 6, 8, respectively, as will be described in detail below, with reference to FIGS. 2–7. Each pick-off line 6, 8 receives an output signal from an associated transducer 62 (see FIG. 6) proportional to the linear velocity of the mirror assemblies 1, 2, respectively, to which it is attached. Integration of these signals, provides an output proportional to the displacements of the corresponding mirror assemblies 1, 2.

To control the amplitudes of oscillation of each mirror assembly 1,2, the velocity signals on lines 6 and 8 are fed back through automatic gain control (AGC) circuits 14, 16 to the driver lines 10, 12, for driving the driver transducers 64 (see FIG. 7) of mirror assemblies 1, 2, respectively. The operation of the AGC circuits 14 and 16 is well known to engineers versed in the art.

In a preferred embodiment of the invention, the phase of one oscillating mirror assembly 1 or 2 relative to the other is controlled. This is accomplished by cross feeding the driver signal on line 10 of the x-axis mirror 1 with data or signals derived from the y-axis pick-off line 8 of the x-axis mirror 2, and the driver signal line 12 of the y-axis mirror 2 with data or signals derived from the x-axis pick-off line 6. In particular, if the AGC circuits 14, 16 are operating properly, the oscillation of both mirror assemblies 1, 2 are maintained at the same amplitude A. However, if the phase angle between the two mirrors is $\phi$, then:

$$x = A \sin \omega t$$

$$y = A \sin (\omega t + \phi) \quad (6)$$

where $\omega$ is the mirror resonance frequency in rad/s. The auxiliary phase signal h is defined as follows:

$$\begin{aligned} h &= \dot{x}\dot{y} + xy\omega^2 \\ &= \omega^2 A^2 [\cos \omega t \cos(\omega t + \phi) + \sin \omega t \sin(\omega t + \phi)] \\ &= \omega^2 A_2 \cos \phi \end{aligned} \quad (7)$$

It is desired that $\phi = \pi$ or that the h attains a minimum value. By comparing h with $-A^2\omega^2$ an error signal is generated that is used by the control servo which drives $\phi$ to $\pi$. The displacement terms x and y can also be obtained by delaying $\dot{x}$ and $\dot{y}$ by $\pi/2$ radians, respectively.

Figure 2:
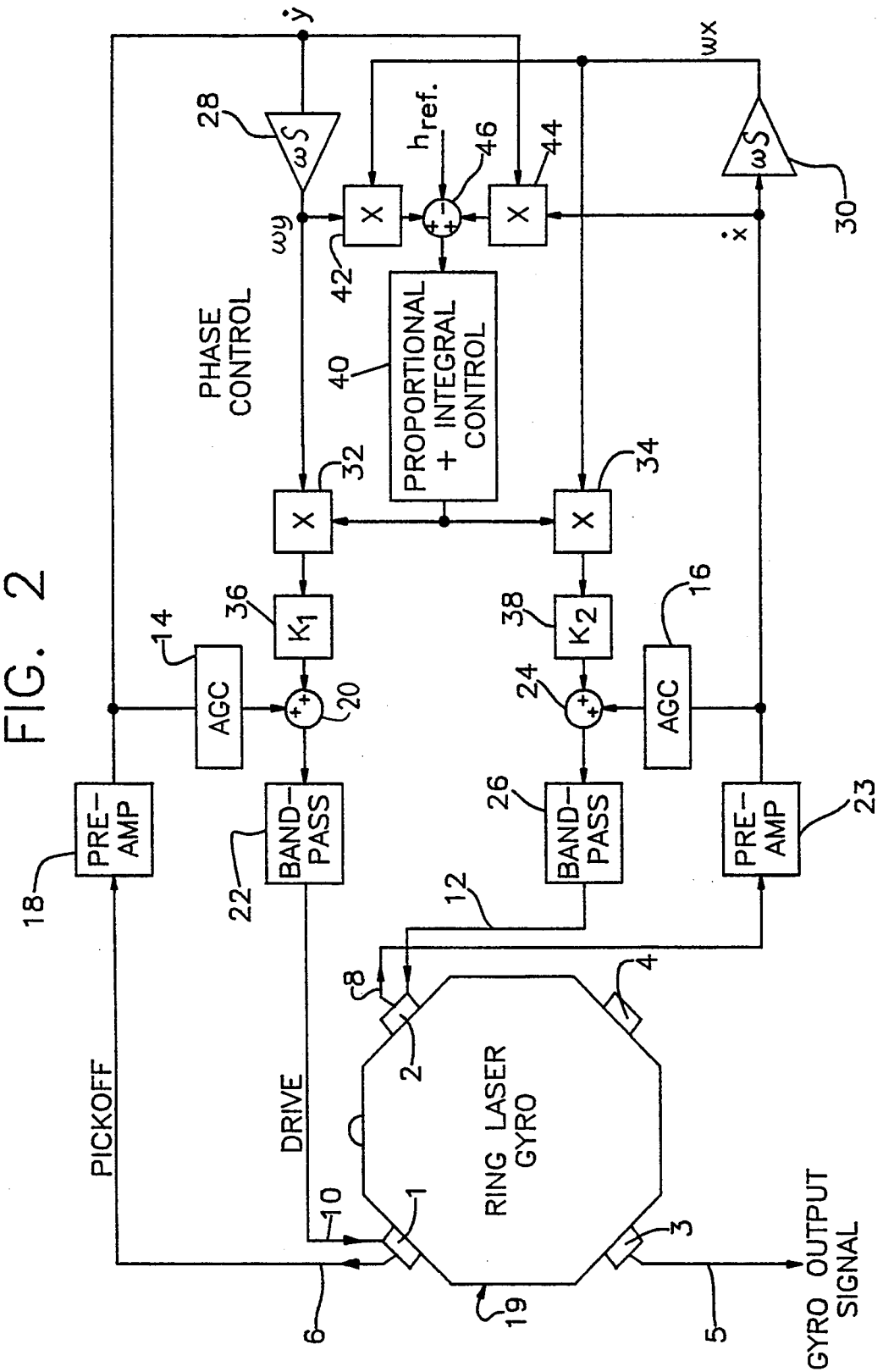
FIG. 2 is block and circuit schematic diagram showing an analog amplitude and phase control system for one embodiment of the invention.
Figure 7:
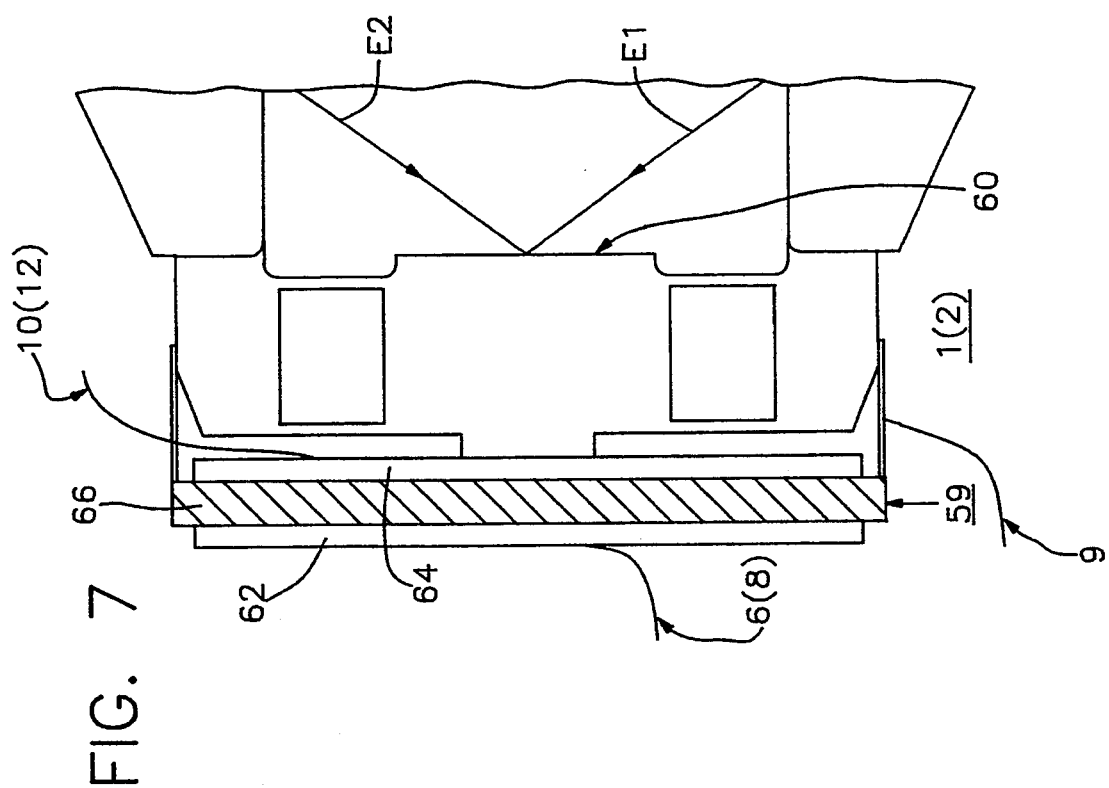
FIG. 7 is a cross-sectional view taken along 6—6 of the mirror assembly of FIG. 6.
Figure 6:
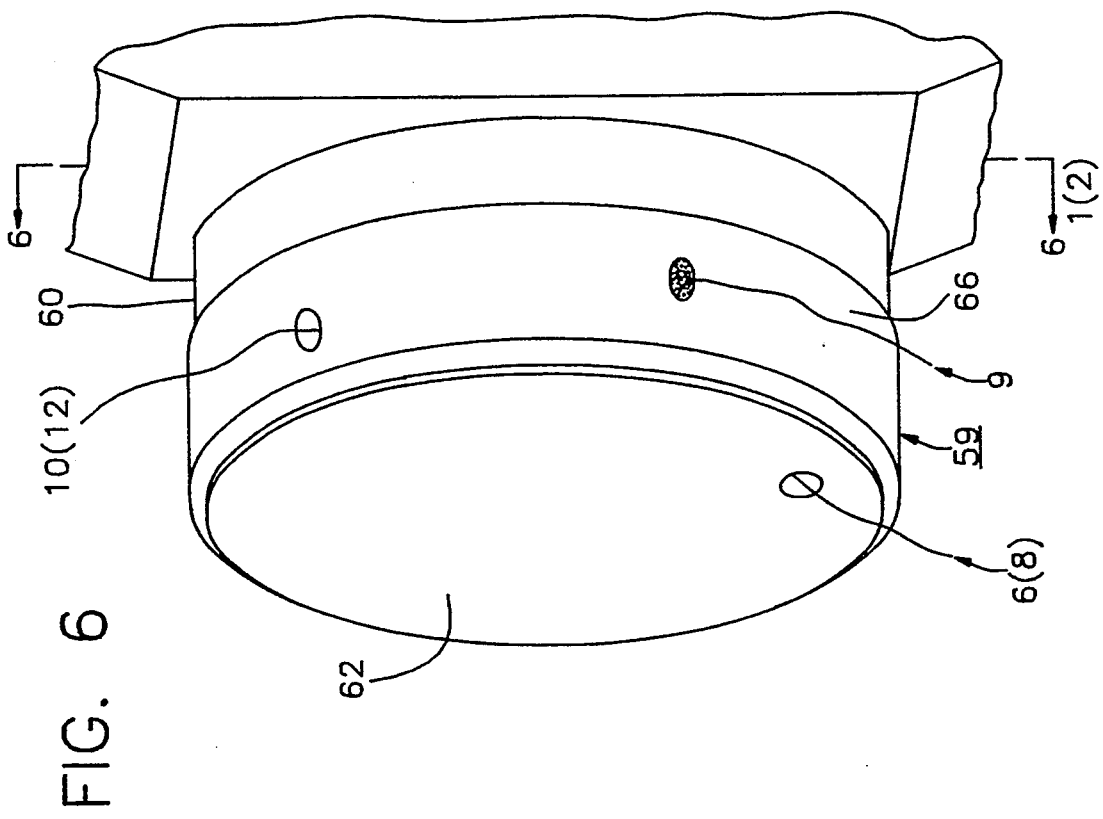
FIG. 6 is a partial pictorial view of a mirror assembly of one embodiment of the invention.

A circuit schematic and block diagram of a preferred analog embodiment of the invention is shown in FIG. 2. A gyro block 19 has two fixed mirrors 3 and 4 and two movable mirror assemblies 1 and 2, as previously mentioned. The latter each have a pick-off line 6 and 8, and a driver line 10 and 12, respectively. A typical gyro output signal line 5 is also shown for feeding an angular velocity signal to a counter (not shown) or output signal processor. A detailed explanation is given below relative to FIGS. 6 and 7, showing pick-off and driver transducers 62, 64, respectively, associated with mirror assemblies 1 and 2, for providing pick-off signals to lines 6 and 8, and receiving driver signals from lines 10 and 12. For purpose of illustration herein, the two axes for the movable mirror assemblies 2 and 1 are designated as the x axis mirror and the y axis mirror, respectively. The output signals on the pick-off line 6 from the y-axis mirror assembly 1 is a signal proportional to the linear velocity $\dot{y}$ of that mirror assembly 1. This signal is connected through a preamplifier 18 to an automatic gain control (AGC) circuit 14. The output of the AGC circuit 14 is connected to a summing junction 20, having an output connected through a bandpass filter 22 to apply a feedback signal to the driver line 10 associated with mirror assembly 1, thus closing a feedback loop for the y-axis mirror assembly 1. Bandpass filter 22 functions to remove noise and other signal interference from the drive signal. The center frequency of filter 22 is at the frequency of the drive signal, in this example 14.0 kHz. Also, filter 22 has a relatively high Q, in this example $Q \approx 10$. The AGC circuit 14 is a standard type, the details of which are well known to electronic engineers, and maintains the amplitude of oscillation of the mirror 60 (see FIGS. 6 and 7) associated with mirror assembly 1 at a constant reference level $\dot{y}_{ref}$ proportional to the desired mirror mechanical amplitude. Another AGC and feedback loop, identical in operation, is provided for the x axis via pick-off line 8, which conducts a signal proportional to ẋ, from mirror assembly 2 through a preamplifier 23 to an AGC circuit 16. The output of AGC 16 is connected to a summing junction 24 providing an output signal to a bandpass filter 26 driving an output or feedback drive signal onto driver line 12, for feedback to mirror assembly 2. Bandpass filter 26 is substantially identical to bandpass filter 22.

An important feature of the invention is the phase control, which is achieved by cross feeding processed signals from the y-axis pick-off line 6 into the x-axis driver line 12, and from the x-axis pick-off line 8 into the y-axis driver line 10. The signal flow in the phase control circuit will now be described.

The signals from the pick-off lines 6 and 8 are integrated by integrators 28 and 30, and scaled therein by an amount equal to $\omega$, to produce outputs $\omega y$ and $\omega x$, respectively. These displacement signals are cross fed into multipliers 32 and 34, respectively, the outputs of which are fed through gain elements 36 and 38, respectively, to provide additional inputs to the summing junctions 20 and 24, respectively. As previously described, the output signals from summing junctions 20 and 24 are passed through bandpass filters 22 and 26, respectively, for applying feedback driver signals onto driver lines 10 and 12, respectively. The other input signal to each of the multipliers 32 and 34 is the output signal from a proportional-plus-integral (PI) control circuit 40, which is an error signal formed by taking the difference between a predetermined phase reference signal $h_{ref}$ and the sum of two input signals derived from the output signals from multipliers 42 and 44, as computed at summing junction 46.

The output signal from multiplier 44 is the product $\dot{x}\dot{y}$ of the velocity signals $\dot{x}$ and $\dot{y}$. The output signal from multiplier 42 is the product $\omega^2 xy$, produced by multiplying $\omega x$ and $\omega y$ together. Thus, the input to the PI control circuit 40 is $h_{ref} - \omega^2 xy - \dot{x}\dot{y} = h_{ref} - A^2\omega^2 \cos\phi$, by the use of equation (7). As a result of the integral action of the PI control circuit 40, drive signals are applied via drive lines 10 and 12 to each of the mirror assemblies 1 and 2, respectively, until $h_{ref} = A^2\omega^2 \cos\phi$. Thus, by adjusting the magnitude of $h_{ref}$, the phase angle $\phi$ can be adjusted. The numerical values of the gain elements 36 and 38 are $K_1$ and $K_2$, respectively, and are adjusted to keep the phase control loop stable and to provide a suitable dynamic response. The values of these gains are not very critical to the operation of the system.

Figure 3:
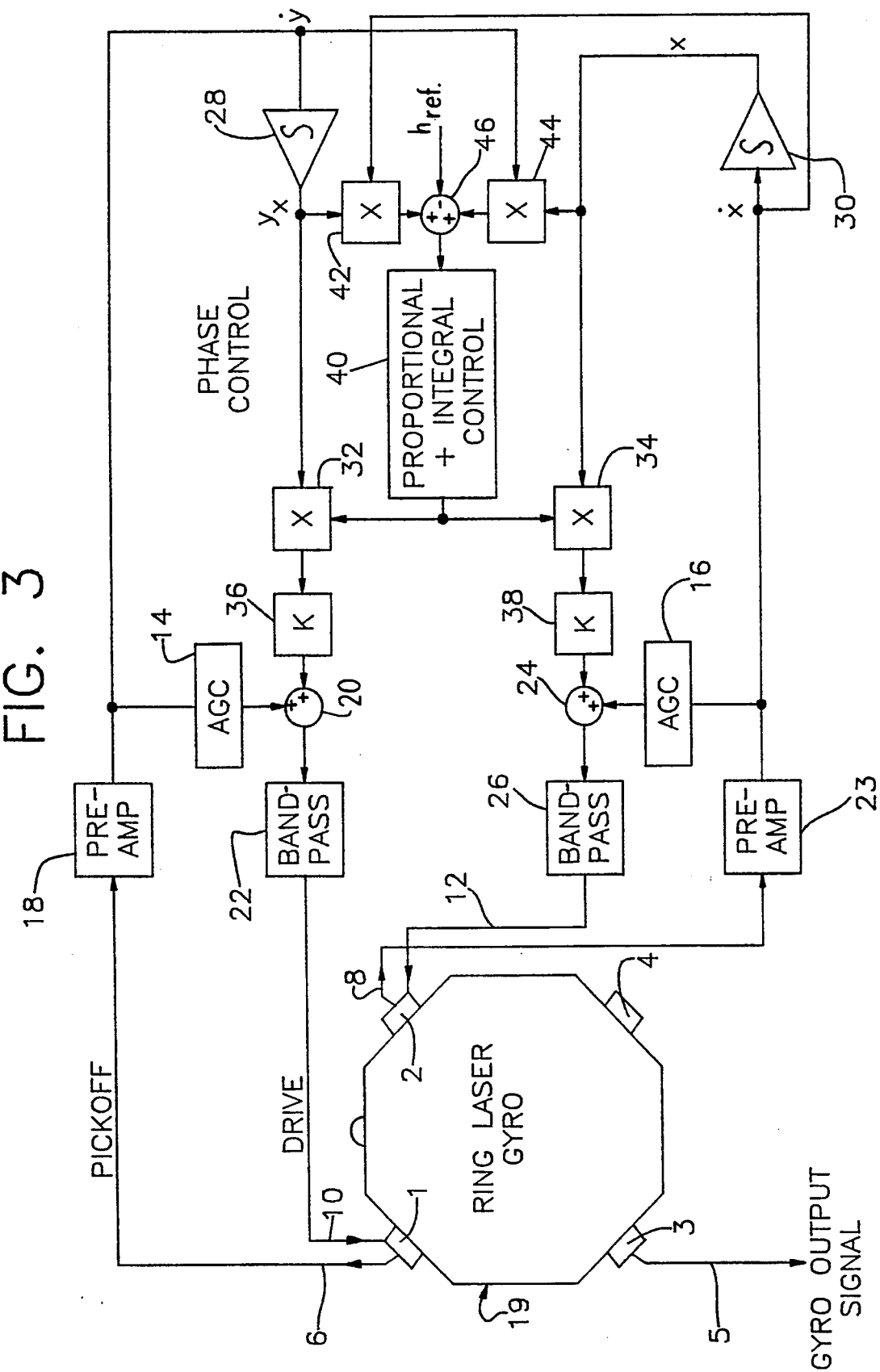
FIG. 3 shows a modified form of the control system of FIG. 2, for an alternative embodiment of the invention.

An alternative embodiment of the phase control is depicted in FIG. 3. The difference between this embodiment and that of FIG. 2 is the way in which the input signal to the PI control is generated. Relative to the embodiment of FIG. 2, in FIG. 3 $\dot{y}$ is not scaled by $\omega$ via integrator 28, but is processed to apply y to multiplier 42. Also, $\dot{x}$ is not applied directly to multiplier 44, but is integrated by integrator 30 to produce x for application to multiplier 44. In this alternative embodiment h is as follows:

$$h = x\dot{y} - \dot{x}y = -A^2\omega \sin\Phi \qquad (8)$$

As previously, it is desired that $\phi = \pi$ or that h attains a value of zero.

Figure 4:
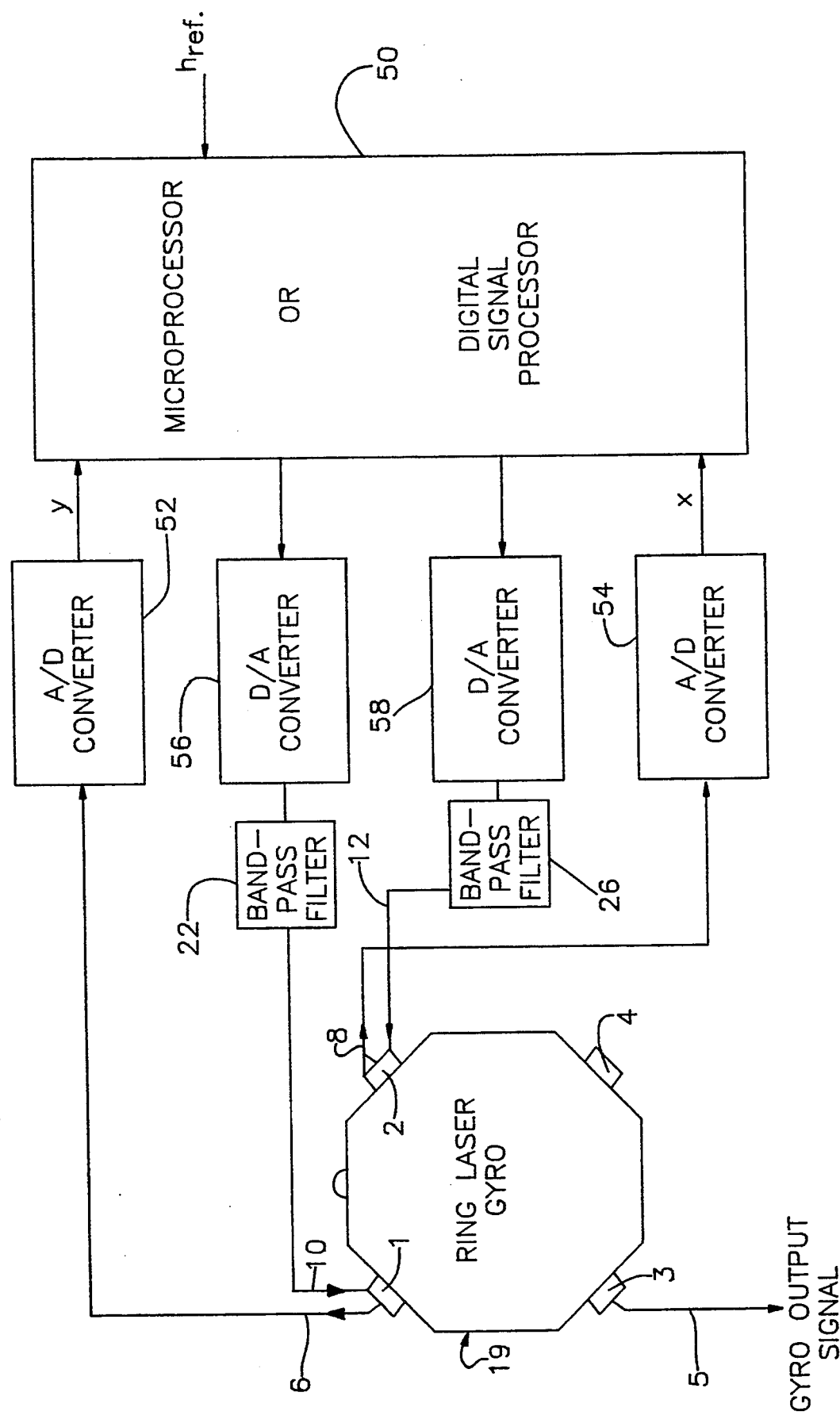
FIG. 4 is a simplified block schematic diagram of a digital control system for a preferred embodiment of the invention.

Another embodiment of the invention, as shown on FIG. 4, makes use of a microprocessor 50 to perform the calculations implied by the analog circuit of FIG. 2 or FIG. 3. This digital embodiment is preferred over either of the analog embodiments because it is more accurate. The output signals from both pick-off lines 6 and 8 are connected to analog-to-digital (A/D) converters 52 and 54, such as the Harris AD774 analog-to-digital converters (manufactured by Harris Corporation, Somerville, N.J.), the outputs of which are applied to microprocessor 50. A microprocessor capable of performing the required calculations required of microprocessor 50 can be provided by a TMS320C30 (manufactured by Texas Instruments, Dallas, Tex.). The result of the computation performed by the microprocessor 50 is applied to two digital-to-analog (D/A) converters 56 and 58, which in this example are AD667 digital-to-analog converters (manufactured by Analog Devices, Norwood, Mass.). A multiplying D/A converter such as the Analog Devices AD7535 may alternatively be used.

In addition to the A/D converters 52 and 54, D/A onverters 56 and 58, and the microprocessor or digital signal processor 50, it may be desirable to include analog filters, such as bandpass filters 22 and 26, to prevent aliasing, to eliminate noise, and to amplify the output of the D/A converters 56 and 58 to the levels required by the drivers. The need for and construction of these devices is well understood by engineers knowledgeable in digital signal processing technology.

The computational operations performed by the analog embodiments are incorporated into the programming for the microprocessor 50. There are may ways of implementing the required mathematical operations, but all of the implementations must consist of two amplitude control loops, and a phase control loop. The two amplitude control loops are identical in function and therefore the description of only one such loop is given below for a software based digital control system, in this example.

In the x-axis amplitude control loop, for example, the sampled input signal is $\dot{x}(nT)$, where T is the sampling period. This signal is first demodulated to obtain the associated mirror amplitude information $X_a(n)$ by means of standard demodulation techniques such as envelop detection ($|\dot{x}(nT)|$ followed by lowpass filtering), square law detection ($\dot{x}^2(nT)$ followed by lowpass filtering), synchronous detection ($\dot{x}(nT) \cos \omega t)^2 + \dot{x}(nT) \sin \omega t)^2$ followed by lowpass filtering), and so forth. The design of a digital lowpass filter is a standard procedure in the field of digital signal processing, for one of ordinary skill in the art. An error signal, $e_x(n)$, is obtained by taking the difference between $x_a(n)$ and an amplitude reference signal $\dot{x}_{ref}$. A digital PI controller then acts on the error signal $e_x(n)$ to generate $u_x(n)$, which is then multiplied by $\dot{x}(nT)$ to produce the amplitude control signal as an input signal to the x-axis the D/A converter 58.

In the phase control loop, a phase reference signal h is first computed in accordance with equations (7) or (8). To ensure a proper phase relation, the two pick-off signals $\dot{x}$ and $\dot{y}$ on pick-off signal lines 8 and 6, respectively, must be sampled synchronously. The phase error signal $e_h(n)$ is fed to a digital PI controller to generate an output $u_h(n)$ which is multiplied by x and y respectively to form the phase control signals at the D/A converters 56 and 58.

Figure 5A:
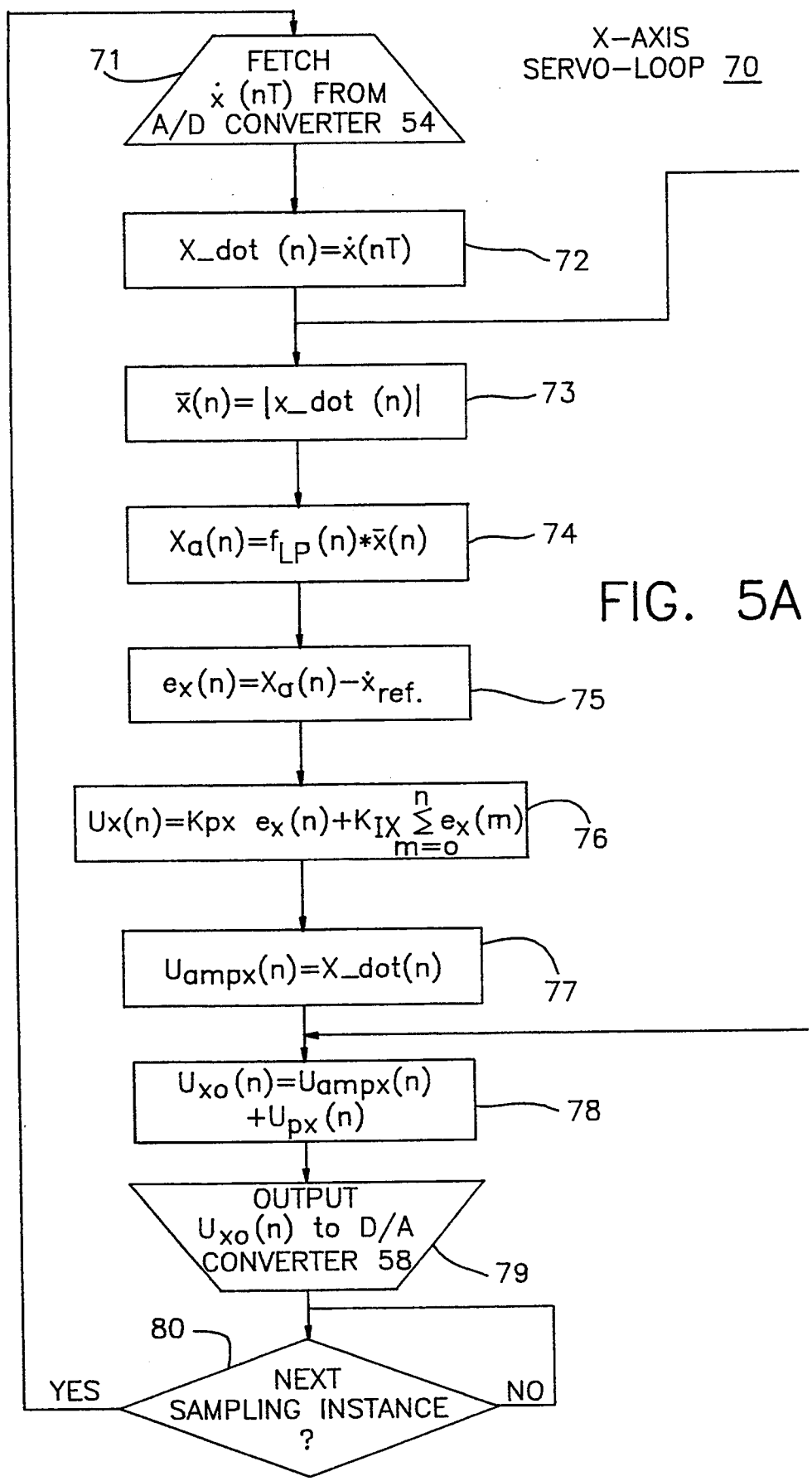
FIGS. 5A and 5B together show a flowchart for programming a microprocessor or a digital controller of a preferred embodiment of the invention.
Figure 5B:
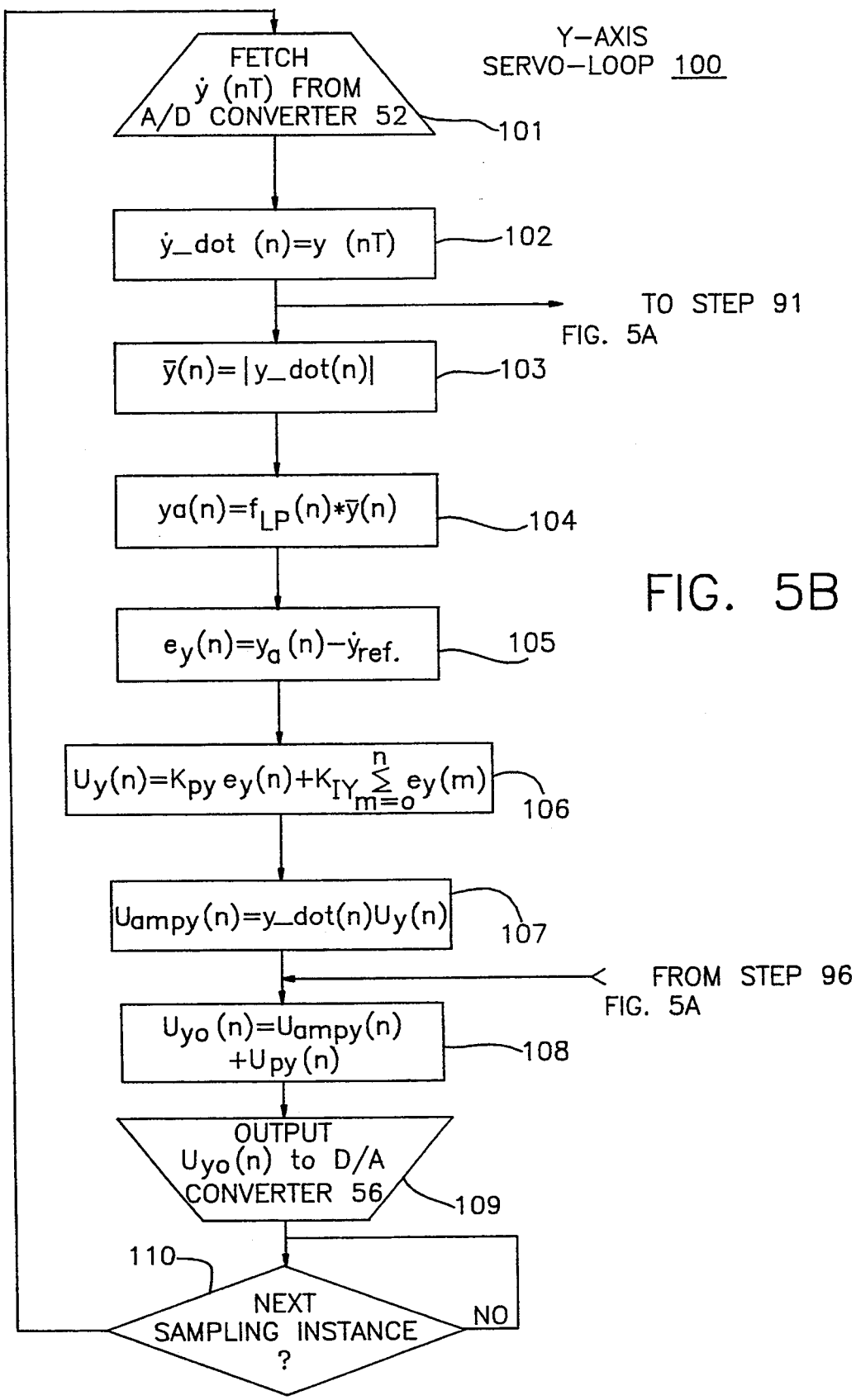

A flowchart for programming the microprocessor or digital signal processor 50 of the digital servo-system is shown in FIGS. 5A and 5B. As shown, the programming provides an x-axis servo-loop 70, a phase control loop 90, and a y-axis servo-loop 100. Note that the x-axis servo-loop 70 and y-axis servo-loop 100 are identical relative to the functional steps or operations that must be performed. In other words, step 71 through 80 are equivalent to steps 101 through 110, respectively, except that in the former signals associated with the x-axis are being processed, whereas in the latter signals associated with the y-axis are being processed. Step 73 and 103 provide an envelope demodulation function, but other demodulation schemes may be utilized as indicated above. Steps 74 and 104 each provide a lowpass filter function. Note that $f_{LP}(n)$ is the unit-sample response of the discrete time lowpass filter, wherein derivation of the same is well known in the art of digital signal processing. Also note that the "*" denotes discrete convolution.

Steps 75 and 105 provide a summing operation analogous to the summing junction of the analog embodiments of the invention. Steps 76 and 106 provide a PI controller function using rectangular integration, in this example. However, other numerical integration techniques such as trapezoidal, Simson's, and so forth, are usable alternative techniques. Steps 77 and 107 provide multiplication functions. Steps 78 and 108 provide summing functions, and are analogous to the summing junctions of analog embodiments of the invention described above. Step 79 and 109 provide drive signals to D/A converters 56 and 58, respectively. Steps 80 and 110 provide sampling instances for the x and y axes, respectively, and are each regulated by the same digital timer or clock (not shown), for insuring that the A/D converters 54 and 52, respectively are synchronized.

In the phase control loop 90, step 91 provides a phase shifting function. Note that $f_{PS}(n)$ is the unit-sampled response of the discrete time phase shifter for delaying X.dot(n) by ninety degrees. Step 92 provides a multiplying and summing function. Step 93 provides a summing function. Step 94 provides a PI controller function similar to steps 76 and 106 in the x-axis and y-axis servo-loops, respectively. Steps 95 and 96 provide multiplication functions or multipliers.

Definitions for various of the terms utilized in the processing steps for the digital processing system or programming will now be given. With regard to steps 76 and 106, $K_{PX}$ and $K_{PY}$ are proportionality constants for the x-axis and y-axis, respectively. $K_{IX}$ and $K_{IY}$ are integration terms associated with the x-axis and y-axis, respectively. In steps 77 and 107, $U_{ampx}(n)$ and $U_{ampy}(n)$ are amplitude control signals for the x-axis and y-axis, respectively. The $U_x(n)$ and $U_y(n)$ are control output signals for the x-axis and y-axis, respectively. In steps 78 and 108, $U_{xo}(n)$ and $U_{yo}(n)$ are the x-axis and y-axis mirror drive signals, respectively. $U_{px}(n)$ and $U_{py}(n)$ are phase control signals for the x-axis and y-axis, respectively.

In step 92, h(n) is the variable appearing in equation (8). In step 93, $e_p(n)$ is a phase error signal, and $h_{ref}$ is a reference command signal. In step 94, $U_p(n)$ is a phase control output signal, $K_{pp}$ is a proportional gain factor, $e_p(m)$ is a phase error term, and $K_{IP}(n)$ is an integral gain factor for the phase control loop. In steps 95 and 96, $U_{px}(n)$ and $U_{py}(n)$ are phase control signals for the x-axis and y-axis, respectively.

The movable mirrors 60 associated with mirror assemblies 1 and 2 are specially constructed to permit them to oscillate at the same resonant frequency. Each is provided by a path length control (PLC) transducer 59 as shown in FIGS. 6 and 7. The PLC transducer 59 is configured with a pick-off transducer member 62 mechanically coupled to a driver transducer member 64. The PLC 59 is also typically directly electrically coupled between the pick-off and drive transducer elements 62, 64, respectively. In this present invention, the pick-off transducer element 62 is not directly electrically coupled to the driver transducer element 64, but is only electrically coupled via the closed loop control system. The PLC transducer assembly is modified such that the top silver electrode on the lead (Pb) zirconate titanate ceramic transducer 62 (a semiconductor transducer, typically known as a "PZT-4" piezoelectric transducer, in this example), is used as a pick-off transducer 62. The bottom PZT 64 is retained as a driver transducer 64. The electrical connection between PZT transducer elements 62 and 64 of the standard PLC is broken or removed. An Invar cup 66 of the standard PLC is retained with PZT transducers 62 and PZT 64 mounted on outside and inside faces of cup 66. Cup 66 acts as a diaphragm for mechanically coupling transducers 62 and 64. As a result, if driver transducer 64 is driven into oscillation or mechanical movement via an applied drive signal from its associated driver line 10 or 12, cup 66 couples this movement to cause like movement of pick-off transducer 62, for producing a pick-off signal on the associated pick-off signal line 6 or 8. A ground line 9 is also provided.

In order for the mirrors 60 of each mirror assembly 1 and 2 to be able to move at the same frequency, the two PLC mirror assemblies 1 and 2 must each first be balanced or tuned to the same fundamental natural frequency. This can be accomplished by displaying the bandpass function of each PLC mirror assembly 1, 2 on a Fast Fourier Transform (FFT) analyzer (not shown). The analyzer supplies a random noise signal that is impressed upon the PLC driver transducer 64. The PLC pick-off transducer 62 is attached to the analyzer to display the bandpass function. Each PLC mirror assembly 1, 2 is brought to the same natural frequency by adding or removing mass from the vibrating parts of the PLC transducers 62 and 64. By the use of this technique it is possible to tune the movable mirror assemblies 1, 2 and associated mirrors 60 to within a few Hertz of each other. Although a number of embodiments of the invention are illustrated and described herein, they are not meant to be limiting. Various modifications of these embodiments may occur to those of skill in the art, which modifications are meant to be covered by the spirit and scope of the appended claims.

What is claimed is:

1. A system for substantially eliminating lock-in in a ring laser gyroscope, said system comprising:
   a mounting block;
   at least one fixed mirror mounted within said mounting block;
   first and second movable mirror assemblies mounted within said mounting block, said first and second movable mirror assemblies each including a mirror and each being specially constructed to naturally oscillate at a common natural resonant frequency such that the mirrors of said first and second movable mirror assemblies both oscillate at said common natural resonant frequency, the combination of said at least one fixed mirror and the mirrors of said first and second movable mirror assemblies being arranged for reflecting laser beams therebetween, thereby establishing a beam path within said mounting block for two counter rotating laser beams;

first and second amplitude control means corresponding to said first and second movable mirror assemblies, respectively, for controlling the amplitudes of oscillation of said first and second movable mirror assemblies so as to insure that the mirrors of said first and second movable mirror assemblies oscillate at said common natural resonant frequency at a predetermined amplitude of oscillation; and phase control means cross-coupled to said first and second amplitude control means, for controlling the phase relationship between said first and second movable mirror assemblies so as to insure that the mirrors of said first and second movable mirror assemblies oscillate at said common natural resonant frequency with a 180° phase difference therebetween.

2. The system of claim 1, wherein said first and second movable mirror assemblies each further include drive means responsive to a drive signal for converting electrical energy into mechanical energy so as to perpetuate an oscillating motion in an associated mirror at said common natural resonant frequency, and pick-off means responsive to said oscillating motion of said associated mirror for converting mechanical energy into electrical energy so as to provide a pick-off signal proportional to the linear velocity of said oscillating motion of said associated mirror.

3. The system of claim 2, wherein said first and second amplitude control means consist of an x-axis servo-loop and a y-axis servo-loop, respectively.

4. The system of claim 3, wherein said x-axis servo-loop includes:
first automatic gain control means responsive to an x-axis pick-off signal from said first movable mirror assembly, for providing an x-axis drive signal to said first movable mirror assembly for controlling the amplitude of oscillation of said first movable mirror assembly so as to insure that the mirror of said first movable mirror assembly oscillates at said common natural resonant frequency at said predetermined amplitude of oscillation.

5. The system of claim 4, wherein said y-axis servo-loop includes:
second automatic gain control means responsive to a y-axis pick-off signal from said second movable mirror assembly, for providing a y-axis drive signal to said second movable mirror assembly for controlling the amplitude of oscillation of said second movable mirror assembly so as to insure that the mirror of said second movable mirror assembly oscillates at said common natural resonant frequency at said predetermined amplitude of oscillation.

6. The system of claim 5, further including:
first bandpass filter means connected between said first automatic gain control means and said first movable mirror assembly, for substantially passing signals centered at said common natural resonant frequency and rejecting noise and other undesirable signals; and
second bandpass filter means connected between said second automatic gain control means and said second movable mirror assembly, for substantially passing signals centered at said common natural resonant frequency and rejecting noise and other undesirable signals.

7. The system of claim 5 further including:

a first summing junction connected in a drive signal line between said first automatic gain control means and said first movable mirror assembly, for receiving said x-axis drive signal from the former and summing it with an x-axis phase signal from said phase control means, for producing a phase corrected x-axis drive signal for application to said first movable mirror assembly; and a second summing junction connected in a drive signal line between said second automatic gain control means and said second movable mirror means, for receiving said y-axis drive signal from the former and summing it with a y-axis phase signal from said phase control means, for producing a phase corrected y-axis drive signal for application to said second movable mirror assembly.

8. The system of claim 7, wherein said phase control means includes:
first integration means for integrating said x-axis pick-off signal $\dot{x}$ to provide an $\omega$ scaled integrated x-axis pick-off signal $\omega x$;
second integration means for integrating said y-axis pick-off signal $\dot{y}$ to provide an $\omega$ scaled integrated pick-off signal $\omega y$;
first multiplier means for multiplying $\omega y$ and $\omega x$ to produce $\omega^2 xy$;
second multiplier means for multiplying $\dot{x}$ and $\dot{y}$ to produce $\dot{x}\dot{y}$;
a third summing junction for subtracting a predetermined phase reference signal $h_{ref}$ from the sum of $\dot{x}\dot{y}$ and $\omega^2 xy$ to produce a phase error signal $e_p=(\dot{x}\dot{y}+\omega^2 xy-h_{ref})$ which is indicative of the error in phase between the x-axis and y-axis movable mirrors;
proportional plus integral control means for forming a phase control signal $u_p$ from said phase error signal $e_p$ according to $u_p=K_{pp}e_p+K_{ip}\int e_p dt$, wherein $K_{pp}$ is a proportional gain factor and $K_{ip}$ is an integral gain factor;
third multiplier means for multiplying $u_p$ by $\omega x$ to produce $\omega x u_p$;
first gain adjustment means for amplifying $\omega x u_p$ by a predetermined amount to produce said x-axis phase signal for application to said first summing junction;
fourth multiplier means for multiplying $u_p$ by $\omega y$ to produce $\omega y u_p$; and
second gain adjustment means for amplifying $\omega y u_p$ by a predetermined amount to produce said y-axis phase signal for application to said second summing junction.

9. The system of claim 7, wherein said phase control means includes:
first integration means for integrating said x-axis pick-off signal $\dot{x}$ to provide an integrated x-axis pick-off signal $x$;
second integration means for integrating said y-axis pick-off signal $\dot{y}$ to provide an integrated pick-off signal $y$;
first multiplier means for multiplying $\dot{y}$ and $x$ to produce $x\dot{y}$;
second multiplier means for multiplying $\dot{x}$ and $y$ to produce $\dot{x}y$;
a third summing junction for subtracting a predetermined phase reference signal $h_{ref}$ from the sum of $x\dot{y}$ and $\dot{x}y$ to produce a phase error signal $e_p=(x\dot{y}+\dot{x}y-h_{ref})$ which is indicative of the error in phase between the x-axis and y-axis movable mirrors;

proportional plus integral control means for forming a phase control signal $u_p$ from said phase error signal $e_p$ according to $u_p = K_{pp}e_p + K_{ip}\int e_p dt$, wherein $K_{pp}$ is a proportional gain factor and $K_{ip}$ is an integral gain factor;

third multiplier means for multiplying $u_p$ by $\omega x$ to produce $xu_p$;

first gain adjustment means for amplifying $xu_p$ by a predetermined amount to produce said x-axis phase signal for application to said first summing junction;

fourth multiplier means for multiplying $u_p$ by y to produce $yu_p$; and second gain adjustment means for amplifying $yu_p$ by a predetermined amount to produce said y-axis phase signal for application to said second summing junction.

10. The system of claim 1, wherein said first and second amplitude control means, and said phase control means are jointly provided by a digital signal processor.

11. The system of claim 2, wherein said first and second amplitude control means and said phase control means are jointly provided by digital signal processing means responsive to first and second pick-off signals from said first and second movable mirror assemblies, respectively, for producing first and second drive signals for application to said drive means of said first and second mirror assemblies, respectively.

12. The system of claim 11 wherein said digital signal processing means includes:

an x-axis A/D converter for receiving an analog x-axis pick-off signal from said first movable mirror assembly, and converting it to a digital x-axis pick-off signal;

a y-axis A/D converter for receiving an analog y-axis pick-off signal from said second movable mirror assembly and converting it to a digital y-axis pick-off signal;

a microprocessor programmed for processing said x-axis and y-axis pick-off signals, and a predetermined phase reference signal $h_{ref}$, for producing digitized x-axis and y-axis drive signals; and x-axis and y-axis D/A converters for converting said digitized x-axis and y-axis drive signals, respectively, into analog x-axis and y-axis drive signals, respectively, for application to said drive means of said first and second mirror assemblies, respectively.

13. The system of claim 2, wherein said drive means includes a first piezoelectric transducer having a first face mechanically connected to an associated mirror, a second face, opposing said first face, mechanically connected to said pick-off means, and an electrical and a mechanical connection to a drive signal line from which said drive signal is received.

14. The system of claim 13, wherein said pick-off means includes:

a second piezoelectric transducer having a first face and a second face, said second face opposing said first face, said second face being electrically and mechanically connected to a pick-off signal line to which said pick-off signal is applied as produced by said second piezoelectric transducer; and a mechanically deflectable element having a first face mechanically connected to the first face of said second piezoelectric transducer, and a second face mechanically connected to the second face of said first piezoelectric transducer, whereby said mechanically deflectable element acts as a diaphragm for coupling mechanical movement from said first piezoelectric transducer to said second piezoelectric transducer.

15. The system of claim 14, wherein said first and second movable mirror assemblies are specially constructed to naturally oscillate at said common natural resonant frequency by adjusting the mass of said first and second piezoelectric transducers and said mechanically deflectable element in each said movable mirror assembly.

16. A system for substantially eliminating lock-in in a ring laser gyroscope during the operation thereof, said system comprising:

a mounting block;

first and second fixed mirrors;

first and second movable mirror assemblies each including a mirror and each being specially constructed to naturally oscillate at a common natural resonant frequency such that the mirrors of said first and second movable mirror assemblies both oscillate at said common natural resonant frequency, said first and second fixed mirrors and the mirrors of said first and second movable mirror assemblies each being mounted within said mounting block relative to each other for reflecting laser beams therebetween so as to establish a beam path within said mounting block for two counter rotating laser beams;

said first and second movable mirror assemblies each including drive means responsive to a drive signal for converting electrical energy into mechanical energy so as to perpetuate an oscillating motion in an associated mirror at said common natural resonant frequency, and pick-off means responsive to said oscillating motion of said associated mirror for converting mechanical energy into electrical energy so as to provide a pick-off signal proportional to the linear velocity of said oscillating motion of said associated mirror;

first amplitude control means responsive to the pick-off signal from said first movable mirror assembly, for providing an amplitude component to the drive signal applied to said associated drive means for controlling the amplitude of oscillation of said first movable mirror assembly so as to insure that the mirror of said first movable mirror assembly oscillates at said common natural resonant frequency at a predetermined amplitude of oscillation;

second amplitude control means responsive to the pick-off signal from said second movable mirror assembly, for providing an amplitude component to the drive signal applied to said associated drive means for controlling the amplitude of oscillation of said second movable mirror assembly so as to insure that the mirror of said second movable mirror assembly oscillates at said common natural resonant frequency at said predetermined amplitude of oscillation;

phase control means responsive to the pick-off signals from said first and second movable mirror assemblies, for providing a phase component to the drive signals applied to the drive means associated with said first and second movable mirror assemblies, respectively, for controlling the phase relationship between said drive signals so as to insure that the mirrors of said first and second movable mirror assemblies oscillate at said common natural resonant frequency with a 180° phase difference therebetween.

17. The system of claim 16, wherein said first and second amplitude control means and said phase control means are responsive to first and second pick-off signals from said first and second movable mirror assemblies, respectively, for providing first and second drive signals for application to said drive means of said first and second mirror assemblies, respectively, so as to insure that the mirrors of said first and second movable mirror assemblies move in manner that causes a doppler shift between light scattered from said counter rotating laser beams within said mounting block.

18. The system of claim 17, wherein said first and second movable mirror assemblies are specially constructed to naturally oscillate at said common natural resonant frequency by adjusting the mass of said first and second movable mirror assemblies.

19. A method for substantially eliminating lock-in in a ring laser gyroscope including at least one fixed mirror and first and second movable mirror assemblies, said method comprising the steps of:

constructing said first and second movable mirror assemblies to naturally oscillate at a common natural resonant frequency;

arranging said at least one fixed mirror and said first and second movable mirror assemblies within a cavity relative to each other so as to allow laser beams to be reflected therebetween, thereby establishing a beam path within said cavity for two counter rotating laser beams;

controlling the amplitudes of oscillation of said first and second movable mirror assemblies so as to insure that the mirrors of said first and second movable mirror assemblies oscillate at said common natural resonant frequency at a predetermined amplitude of oscillation; and controlling the phase relationship between said first and second movable mirror assemblies so as to insure that the mirrors of said first and second movable mirror assemblies oscillate at said common natural resonant frequency with a 180° phase difference therebetween.

20. The method of claim 19, wherein said step of constructing said first and second movable mirror assemblies includes the step of adjusting the mass of said first and second movable mirror assemblies.

21. The method of claim 20, wherein said steps of controlling the amplitudes of oscillation and controlling the phase relationship include the steps of allowing said first and second movable mirror assemblies to oscillate at said common natural resonant frequency while controlling the amplitudes of oscillation of said first and second movable mirror assemblies and the phase relationship between said first and second movable mirror assemblies.

* * * * *

UNITED STATES PATENT AND TRADEMARK OFFICE
CERTIFICATE OF CORRECTION

PATENT NO. : 5,359,413
DATED : October 25, 1994
INVENTOR(S) : TIMOTHY N. CHANG ET AL.

It is certified that error appears in the above-indentified patent and that said Letters Patent is hereby corrected as shown below:

On the title page

ITEM 54, PLEASE CHANGE "ELEMINATING" to -- ELIMINATING --.

COL. 1, LINE 1, CHANGE "ELEMINATING" TO --ELIMINATING--.

Signed and Sealed this

Thirty-first Day of October 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,359,413

DATED : October 25, 1994

INVENTOR(S) : Timothy N. Chang et al

It is certified that error appears in the above-identified patent and that said Letters Patent is hereby corrected as shown below:

On the title page, item [75] Inventors: please change "Timothy H. Chang" --Timothy N. Chang--.

Signed and Sealed this

Sixteenth Day of January, 1996

Attest:

BRUCE LEHMAN

*Attesting Officer*  *Commissioner of Patents and Trademarks*